United States Patent [19]
Ellegaard

[11] Patent Number: 6,105,308
[45] Date of Patent: Aug. 22, 2000

[54] CASING PACKAGED BLOCK MEMBER OF GROWTH SUBSTRATE

[76] Inventor: Øyvind Ellegaard, Højvangs Parkvej 34, DK-6700 Esbjerg, Denmark

[21] Appl. No.: 09/045,695

[22] Filed: Mar. 23, 1998

Related U.S. Application Data

[63] Continuation-in-part of application No. PCT/DK96/00403, Sep. 23, 1996.

[30] Foreign Application Priority Data

Sep. 22, 1995 [DK] Denmark ................................ 1060/95

[51] Int. Cl.[7] .................................................... A01G 31/02
[52] U.S. Cl. ............................... 47/58.1; 47/65.5; 47/65.7
[58] Field of Search ................... 47/58.1, 65.5, 47/65.7

[56] References Cited

FOREIGN PATENT DOCUMENTS 0 255 690  2/1988  European Pat. Off. .

*Primary Examiner*—Leon B. Lankford, Jr.
*Attorney, Agent, or Firm*—Sixbey, Friedman, Leedom & Ferguson; David S. Safran

[57] ABSTRACT

In the horticulture, large amounts of growth substrate blocks are used for the growing of cuttings, and these blocks should preferably be surrounded by a paper like casing. For the very manufacturing of these block packaging the casing material should be of a reasonably strong and good quality, which, however, may cause problems later on, when the plant roots during their growth pack against the casing wall. With the invention there is used for the casing a dual fraction material comprising partly a long-time durable, open web and partly a reinforcing and more or less web filling or covering material of a type that is brought to disintegrate either in the manufacturing process or in a suitably rapid manner by the natural influences, in particular moisturing, to which the blocks are exposed when taken in use. Thereafter, the said web may hold the block together without preventing root penetration.

9 Claims, 1 Drawing Sheet

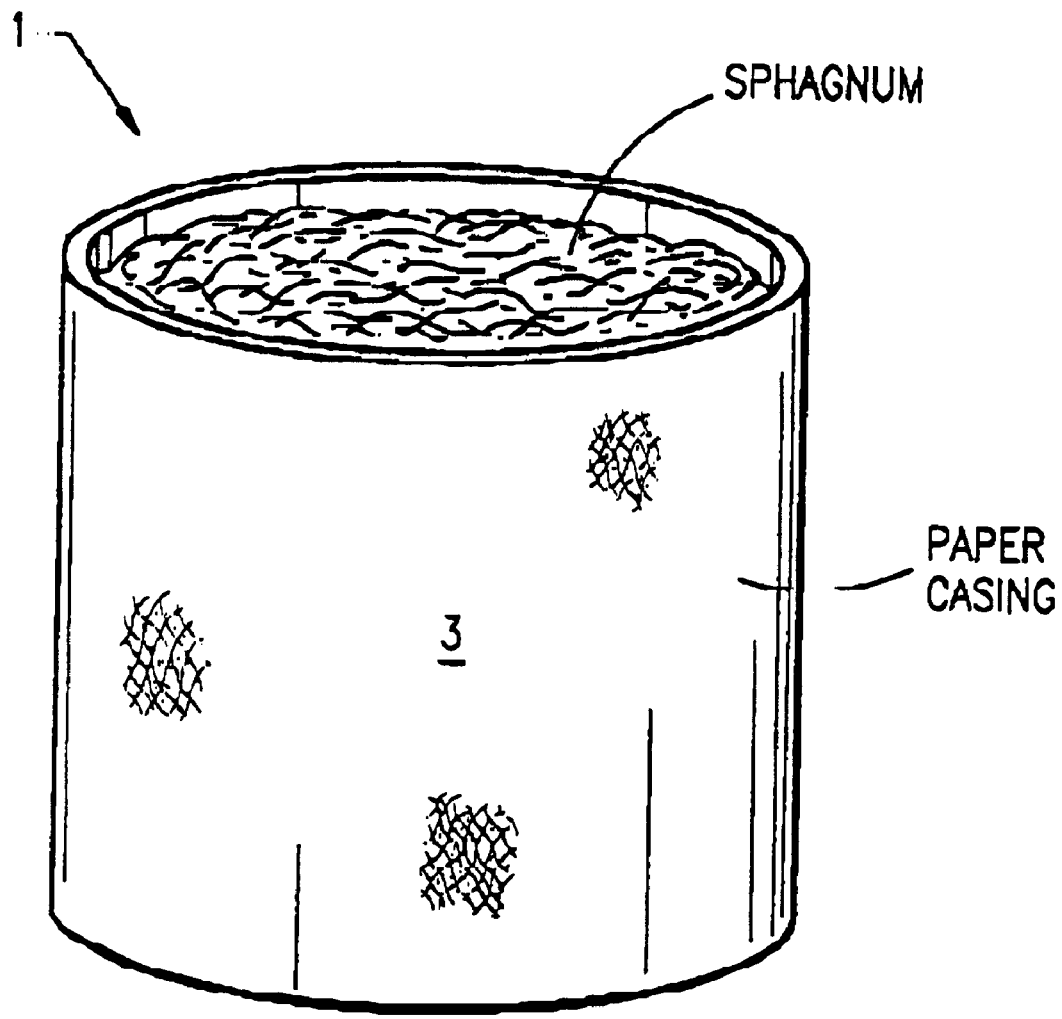

CASING PACKAGED BLOCK MEMBER OF GROWTH SUBSTRATE

CROSS REFERENCE TO RELATED APPLICATION

This is a continuation-in-part of Internation Application PCT/DK96/00403 filed Sep. 23, 1996, and which designated the United States.

BACKGROUND OF THE INVENTION

1. Field of the Invention

The present invention concerns a block body of growth substrate, like peat moss, packed in a casing for use when forcing cuttings, possibly from seeds, to young plants for transfer to plant pots or for directly planting out.

2. Description of Related Art

For the above-noted purpose, there is also known special vacuum formed plastic foil trays with cells of indentations; but, for environmental reasons, it should be preferred to use block bodies of the kind enveloped in a paper-like casing which decomposes to a greater or lesser degree as the time passes by. These block bodies may wholly be transferred to the plant pots at the planting out whereby the packing do not imply any remaining problems.

The casings used should be reasonably durable at the outset, partly in order to be handled mechanically in the production of the block bodies and partly in order to withstand the action of mounting the seeds or cuttings. Naturally the casing should be also be kept intact when the block bodies are to be transferred to the plant pots, which often happens after 3 to 6 weeks, for some plants, though only after about 1 year.

As a consequence of the block bodies having to be as small as possible for considerations of space, it occurs in the meantime that the roots reach the casing, which already may happen after about one week. It is acknowledged, that it will be better for the roots to grow a little out through the side of the block instead of being packed together at the inside of the casing, and in many market gardenings, it is preferred to treat the casings in order to produce holes or slits in them. However, this is both arduous and has little effect and it has been investigated whether it would be possible from the beginning to use a material with a more perceptible degree of perforation. Tests with respect to this have failed until now due to the fact that a suitable material then becomes so difficult to handle at the production of the block bodies, where it is a requirement that the mass production in question has to proceed without interruptions.

It has already been proposed that, with respect to this purpose, that a special "Agricultural Paper" be used, see e.g. published European Patent Application No. 0 255 690, consisting of two layers, namely of a layer of natural fiber material, i.e. pulp, and of a thin, porous layer of synthetic fibers, whereby there is aimed at the fiber material's rather quick decomposition after the planting out, and that the roots then may penetrate the outer cohesive layer.

However, it appears that the fiber material in connection with the small block sizes will take such a long time to decompose that the roots normally will pack together against such a layer. Besides that, such a material will also be relatively expensive, because it requires a special production at the relevant wet laying out. Furthermore, synthetic materials are no longer welcome in nature.

SUMMARY OF THE INVENTION

By the invention, it is realized that an improved material may be constituted by a fleece tissue of mixed fibers, preferably mainly of cellulose fibers, namely partly of natural fibers and partly of improved quality cellulose fibers, normally called impregnated fibers, together with a small admixture of natural or exceptionally of synthetic binding fibers.

BRIEF DESCRIPTION OF THE DRAWINGS

The sole FIGURE shows a block body formed in accordance with the present invention.

DETAILED DESCRIPTION OF THE PREFERRED EMBODIMENT

In accordance with the present invention, a block body 1 formed of a paper casing 3 that is filled with sphagnum, i.e., peat moss is made of a fleece tissue of mixed fibers, preferably mainly of cellulose fibers, namely partly of natural fibers and partly of improved quality cellulose fibers, normally called impregnated fibers, together with a small admixture of natural or exceptionally of synthetic binding fibers. By dry-laying out to a non-woven product hereby, a porous fleece material is created, whereby the close environment has easy access to the fibers themselves, which then, in the case of the natural fibers, results in a rather quick decomposition, e.g. already after 1 to 3 weeks depending on the pH value of the earth. Commencing decomposition may take place already before the potting or the planting out, so that the root types in a desirable way may reach the ambient air before that time. The decomposition will result in an increasing amount of porosity rather than a decreasing layer thickness, and the roots will quickly have an increased freedom to grow out through the wall.

The necessary coherence in the material may be ensured by admixing only about 10% or less of binding fibers that may be activated by heat, which also will make it possible to utilize heat welding for creating the casings.

The weight of a square meter will typically be in the range of 15 to 50 g. Preferably, there is used classified fibers of 5 to 15 mm length, and by the mentioned examples of fibers, it is to possible to obtain a 100% environmentally friendly product. The mixture ratio of the fibers may be widely varied depending on whether a greater or lesser root penetration is wanted.

Principally, the invention will not be limited to special fiber materials, but naturally it is a lucky circumstance that just cellulose (viscose) is very suitable for creating the fleece tissue. It may be advantageous and acceptable if the fibers with better keeping qualities contain a certain amount of polyester fibers or corresponding material. If the relatively very short decomposition time is not wanted there may be used fibers with a certain degree of impregnation instead of the natural or unimpregnated fibers.

It should be noted that the mentioned casing material has a special relation to the manufacturing technique described in published European Patent Application No. 0 548 167, where it is important that the material is highly air permeable. In connection with the use other known manufacturing techniques, this may not be a requirement, and then, it may be possible to support the fiber gauze which have long-term keeping or holding qualities in another way, e.g. by laminating with a quickly decomposing film material or by impregnating the gauze with a relevant filler material, e.g. on the basis of a starch.

It should be emphasized, that it will not always be necessary that the casing material be intact at the time when the block bodies are mounted with seed or cuttings, and in that case, it will be of minor importance with respect to the product if the "opening" of the material takes place before the products leaves the facility where the block bodies are manufactured and possibly placed in receiving trays. In the example with the film laminate, this may be burned off or just melted by heating in a process step after the forming of the product, possibly in connection with a pasteurizing of the filled trays or by infrared irradiation. By the use of other filler materials, there may be utilized adapted methods for a controlled removal or "opening" of the materials, and the invention will thereby also comprise a such block body production.

I claim:

1. A method for manufacturing block bodies of a growth substrate packed in a casing, said casing being a fleece material made up of at least two different types of fibers, comprising the steps of: providing first fibers of a type which have long-term holding properties from a standpoint of decomposition when exposed to a moist environment and second fibers of a type with short-term holding properties from a standpoint of decomposition when exposed to a moist environment; forming a fleece material made up of a mixture of said at least two types of fibers, forming the fleece material into the casing.

2. A method according to claim 1, wherein said fleece material is formed as a non-woven fleece material; and wherein a material selected from the group consisting of natural or low-impregnated cellulose or viscose fibers is used, at least primarily, for said second fibers of a type with short-term holding properties.

3. A method according to claim 1, wherein said fleece material is formed as a non-woven fleece material; and wherein a material selected from the group consisting of impregnated cellulose fibers or impregnated cellulose fibers with a small admixture of a synthetic fiber material is used, at least primarily, for said second fibers of a type with long-term holding properties.

4. A method according to claim 1, wherein a filler or cover material is included with said second fibers for formation of said fleece material, and wherein the method further comprises the further step of at least partially removing the filler or cover material after formation of the packed block bodies.

5. A method according to claim 1, comprising the further step of filling the casing with peat moss as said growth substrate.

6. A method according to claim 1, wherein said forming step is performed by dry laying out of the at least two types of fibers to produce the fleece material.

7. A block body comprising a growth substrate packed in a casing formed of a fleece material made up of a mixture of at least two different types of fibers, a first of said at least two different types of fibers having long-term holding properties from a standpoint of decomposition when exposed to a moist environment and a second of said at least two different types of fibers having short-term holding properties from a standpoint of decomposition when exposed to a moist environment, whereby said fleece experiences an increase in porosity when exposed to a moist environment due to faster decomposition of the second of said at least two different types of fibers.

8. A block body according to claim 7, wherein the second of said at least two different types of fibers comprise natural or low impregnated cellulose or viscose fibers; and wherein the first of said at least two different types of fibers comprise highly impregnated cellulose fibers with a low content of heat activated binding fibers.

9. A block body according to claim 7, wherein the growth substrate packed in the casing is peat moss.

* * * * *